US010430238B1

(12) United States Patent
Rohrbach et al.

(10) Patent No.: US 10,430,238 B1
(45) Date of Patent: Oct. 1, 2019

(54) PROGRAMMATICALLY APPLYING LABELS TO NODES IN CLUSTER ORCHESTRATION PLATFORMS

(71) Applicant: Capital One Services, LLC, McLean, VA (US)

(72) Inventors: Kyle Rohrbach, New York, NY (US); Serhiy Danchenko, Fair Lawn, NJ (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/426,548

(22) Filed: May 30, 2019

(51) Int. Cl.
*G06F 9/455* (2018.01)
*G06F 9/48* (2006.01)

(52) U.S. Cl.
CPC ........ *G06F 9/4881* (2013.01); *G06F 9/45558* (2013.01); *G06F 2009/45591* (2013.01)

(58) Field of Classification Search
CPC ... H04L 41/0893; H04L 41/12; G06F 16/288; G06F 16/9024; G06F 16/164; G06F 17/273; G06F 9/45558
See application file for complete search history.

(56) References Cited

U.S. PATENT DOCUMENTS

| | | | |
|---|---|---|---|
| 9,813,305 B2* | 11/2017 | Bertram | H04L 41/22 |
| 10,198,250 B1* | 2/2019 | Sharma | G06F 16/9024 |
| 10,248,532 B1* | 4/2019 | Wasiq | G06F 11/3452 |
| 2016/0042031 A1* | 2/2016 | Bertram | G06F 16/164 |
| | | | 707/736 |
| 2017/0364698 A1* | 12/2017 | Goldfarb | G06F 21/6218 |
| 2017/0366425 A1* | 12/2017 | Latapie | H04L 67/02 |
| 2018/0018303 A1* | 1/2018 | Vasiltschenko | G06F 17/212 |
| 2018/0103064 A1* | 4/2018 | Ahuja | H04L 63/20 |
| 2018/0121221 A1* | 5/2018 | Ahuja | G06F 9/45558 |

(Continued)

OTHER PUBLICATIONS

Author unknown, "Tag Clusters", Amazon Web Service, Inc. [online] 2019 [retrieved on May 29, 2019]. Retrieved from Internet URL: https://docs.aws.amazon.com/emr/latest/ManagementGuide/emr-plan-tags.html, 2 pages.

(Continued)

*Primary Examiner* — Dong U Kim

(57) ABSTRACT

Systems, methods, and computer program products to programmatically apply labels to nodes in a cluster orchestration platform managing a cluster comprising a plurality of nodes. A microservice may be submitted to the cluster orchestration platform. The cluster orchestration platform may execute the microservice on a first node of the plurality of nodes. The microservice may receive, from a virtual machine manager, an instance identifier of a virtual machine instance executing the first node and the microservice. The microservice may receive, from the virtual machine manager based on the instance identifier, a plurality of labels applied to the virtual machine instance. The microservice may validate each received label based on at least one rule. The microservice may receive, from the cluster orchestration platform, an identifier of the first node in the cluster orchestration platform. The microservice may apply each received label to the first node in the cluster orchestration platform.

17 Claims, 7 Drawing Sheets

(56) References Cited

U.S. PATENT DOCUMENTS

2018/0309637 A1* 10/2018 Gill ......................... H04L 67/36

OTHER PUBLICATIONS

Author unknown, "AWS CLI Command Reference", Amazon Web Services, [online] 2018 [retrieved on May 29, 2019]. Retrieved from Internet URL: https://docs.aws.amazon.com/cli/latest/reference/ec2/describe-tags.html.

Author unknown, "Concepts—Labels and Selectors", kubernetes,[online] 2019 [retrieved on May 29, 2019]. Retrieved from Internet URL: 9https://kubernetes.io/docs/concepts/overview/working-with-objects/labels/#synt, 10 pages.

Author unknown, "kkubernetes / cloud-provider-aws" GitHub [online] [retrieved on May 29, 2019]. Retrieved from Internet URL: thttps://github.com/kubernetes/kubernetes/blob/master/pkg/cloudprovider/providers/aws/tags.go, 3 pages.

\* cited by examiner

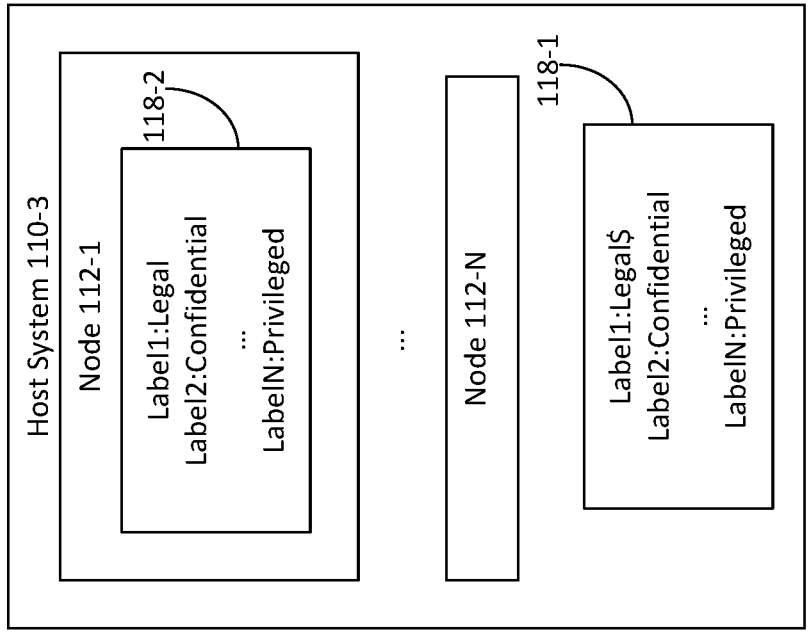
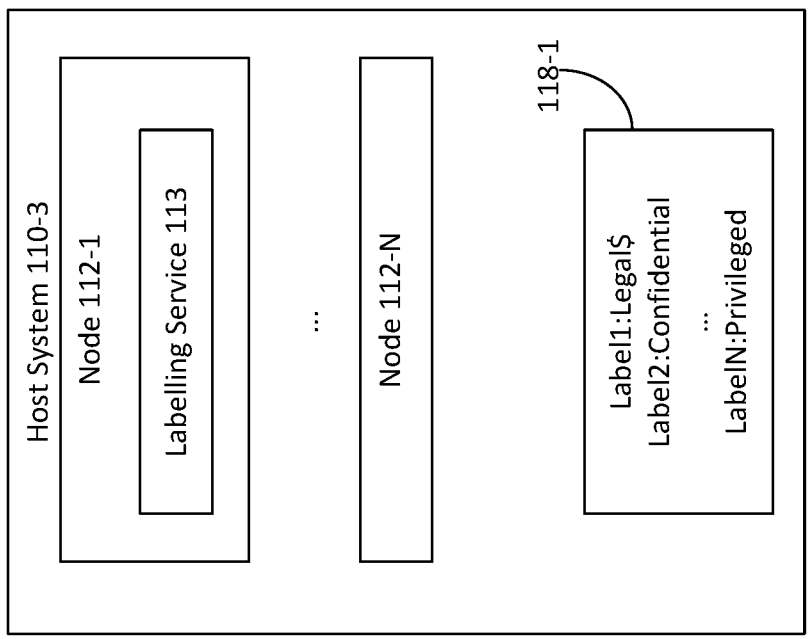

PROGRAMMATICALLY APPLYING LABELS TO NODES IN CLUSTER ORCHESTRATION PLATFORMS

TECHNICAL FIELD

Embodiments herein generally relate to cluster orchestration platforms, and more specifically, to programmatically applying labels to nodes in cluster orchestration platforms.

BACKGROUND

Cluster orchestration platforms may allow nodes to be tagged with labels for various purposes, such as submitting a job to a labeled node, resource management, and the like. However, manually labeling each node in a cluster is a time consuming and error-prone process. Configuring startup scripts to label each node is also undesirable as doing so requires significant modifications to each script to apply the labels as needed.

SUMMARY

Embodiments disclosed herein provide systems, methods, articles of manufacture, and computer-readable media for programmatically applying labels to nodes in cluster orchestration platforms. In one example, a microservice may be submitted to a cluster orchestration platform managing a cluster comprising a plurality of nodes, the microservice to execute on one of the plurality of nodes. The cluster orchestration platform may execute the microservice on a first node of the plurality of nodes. The microservice may receive, from a virtual machine manager, an instance identifier of a virtual machine instance executing the first node and the microservice. The microservice may receive, from the virtual machine manager based on the instance identifier, a plurality of labels applied to the virtual machine instance. The microservice may validate each received label based on at least one rule for applying labels in the cluster orchestration platform. The microservice may receive, from the cluster orchestration platform, an identifier of the first node in the cluster orchestration platform. The microservice may provide, to the cluster orchestration platform, an indication specifying to apply each received label to the first node in the cluster orchestration platform. The cluster orchestration platform may apply each received label to the first node in the cluster orchestration platform.

BRIEF DESCRIPTION OF THE DRAWINGS

FIGS. 2A-2B illustrate embodiments of programmatically applying labels to nodes in a cluster orchestration platform.

DETAILED DESCRIPTION

Figure 1A:
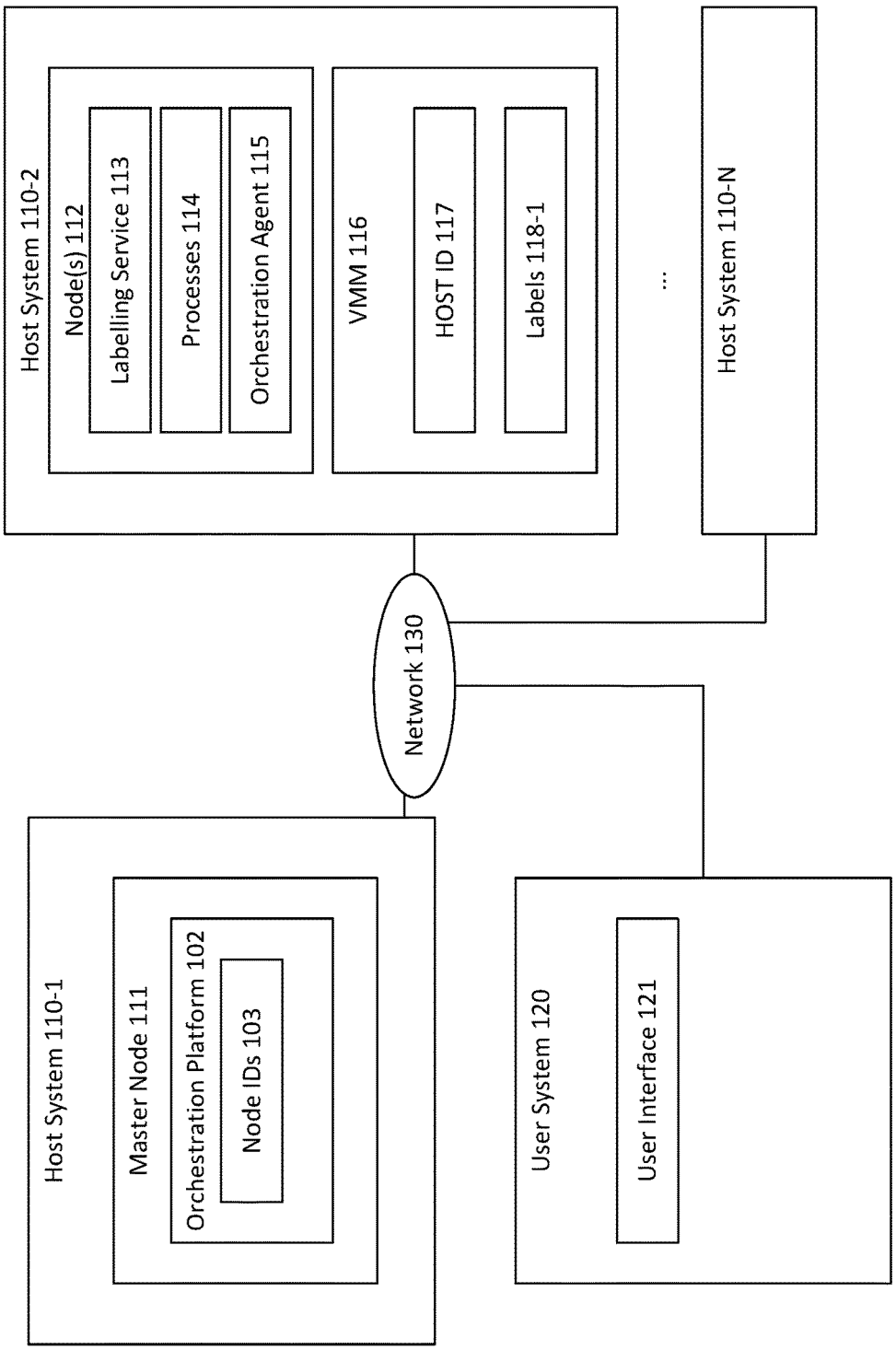
FIGS. 1A-1B illustrate embodiments of a system configured to programmatically apply labels to nodes in a cluster orchestration platform.

Embodiments disclosed herein provide techniques to programmatically label (or tag) nodes in a cluster orchestration platform managing one or more clusters of nodes. Generally, embodiments disclosed herein leverage a flexible microservice that can be deployed to any node in the cluster orchestration platform and apply labels to the node. The microservice may be scheduled to execute prior to any other jobs that may be submitted to perform computational tasks on a given node. Once executed, the microservice may receive, from a virtual machine manager, an instance identifier of a virtual machine within which the first node and the microservice execute. The virtual machine may be tagged with one or more labels. The microservice may receive the labels applied to the virtual machine instance from the virtual machine manager. The microservice may validate each label based on at least one rule such as syntax rules and/or regular expressions. The microservice may receive an identifier of the first node in the cluster orchestration platform. The microservice may then specify to apply each received label to the first node in the cluster orchestration platform.

Advantageously, embodiments disclosed herein provide lightweight, flexible techniques to tag nodes with labels in a cluster orchestration platform. By leveraging a microservice to tag any node in any type of cluster orchestration platform, embodiments disclosed herein do not require modification of startup scripts and/or source code of individual nodes, cluster orchestration platforms, jobs, or any other associated components. Furthermore, embodiments disclosed herein do not require modification to settings and/or configurations to label the nodes. Further still, by labeling nodes before processes are scheduled for processing on the nodes, the microservice may ensure that the processes are scheduled to the correct nodes.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed embodiments. As shown, the system 100 includes one or more host systems 110 and one or more user systems 120 communicably coupled by a network 130. The host systems 110 and the user systems 120 are representative of any type of computing system, such as servers, compute clusters, desktop computers, smartphones, tablet computers, wearable devices, laptop computers, workstations, portable gaming devices, virtualized computing systems, and the like. The host systems 110 and the user systems 120 include processors, memory, storage, network interfaces, and/or other components not pictured for the sake of clarity.

The system 100 is generally configured to provide management of containerized workloads and services using clusters comprising one or more of the host systems 110. More specifically, as shown, host system 110-1 includes a master node 111 executing an instance of a cluster orchestration platform 102. The cluster orchestration platform 102 generally manages the deployment of one or more nodes 112 on one or more of the host systems 110-1 through 110-N, where N is a positive integer. The nodes 112 individually and/or collectively may form one or more clusters of nodes 112. Although a single node 112 is depicted on host system 110-2, any number of nodes 112 may be deployed on a given host system 110-N. For example, host system 110-2 may include ten nodes 112, while host system 110-N may execute five nodes 112. The cluster orchestration platform 102 may further manage the scheduling of one or more processes (such as the processes 114), services, jobs, and/or workloads on the nodes 112. In this regard, the nodes 112 may be considered as worker nodes that perform one or more processing tasks. One example of a cluster orchestration platform 102 is Kubernetes®. However, the disclosure is equally applicable to other types of cluster orchestration platforms.

As stated, the host systems 110-1 through 110-N may be physical and/or virtualized computing systems. In one embodiment, the host systems 110-1 through 110-N are virtualized computing systems executing on physical computing systems (not pictured) provided by a cloud computing platform. In such an embodiment, a virtual machine manager (VMM) 116 of the cloud computing platform may create, run, and generally manage the virtual host systems 110-1 through 110-N. One example of a VMM 116 is a hypervisor. Although depicted as executing in the host system 110-2, in some embodiments, the VMM 116 may execute external to the host system 110-2.

By operating at the container level, the orchestration platform 102 may generally provide deployment, scaling, load balancing, logging, and monitoring in the system 100. For example, a user may submit one or more jobs, workloads, and/or processes (collectively referred to as processes 114 herein) for deployment to the orchestration platform 102 via the user interface 121. In such an example, the orchestration platform 102 may schedule the process 114 on one or more nodes 112 executing on one or more of the host systems 110-1 through 110-N. In some examples, the orchestration platform 102 may need to deploy a new node 112 to a host system 110-N to accommodate the received process 114.

In deploying one or more new nodes 112 and/or scheduling one or more processes 114, the orchestration platform 102 may receive input specifying where to deploy the nodes 112 and/or schedule the processes 114. For example, the user may specify to deploy an accounting process 114 on all nodes that are tagged with one or more accounting labels (not pictured in FIG. 1A). The labeling of a given node 112 may require input specifying a key:value pair. Conventionally, the labeling of a node 112 requires a significant amount of human intervention, such as labeling each node 112 manually with the appropriate label and/or programming the orchestration platform 102, nodes 112, and/or the processes 114 to apply one or more labels.

Advantageously, however, embodiments disclosed herein provide a labeling service 113. The labeling service 113 is a microservice that may be deployed by the orchestration platform 102. For example, the labeling service 113 may be scheduled for execution when a given node 112 is deployed to a host system 110-2 through 110-N. As another example, a user may specify to schedule the labeling service 113 for execution on one or more nodes 112 of one or more host systems 110-2 through 110-N. In some embodiments, the orchestration platform 102 schedules the labeling service 113 to execute prior to any other process 114 on the corresponding node 112. In one embodiment, the labeling service 113 is scheduled as a DaemonSet, which allows the labeling service 113 to execute prior to the other processes 114 on the node 112. Doing so allows the labeling service 113 to label the nodes 112 before any processes 114 are scheduled, deployed, and/or executed on each node 112 (e.g., by the orchestration platform 102). For example, the orchestration platform 102 may determine whether a particular type of label (e.g., "GPU") is applied to the nodes 112 when scheduling different processes 114 (e.g., processes that require a graphics processing unit (GPU) for processing) to the nodes 112. In some embodiments, if the labeling service 113 does not label the nodes 112 before the orchestration platform 102 schedules processes 114 to the nodes 112, the orchestration platform 102 may do so with incomplete and/or incorrect labels applied to the nodes 112. As such, the orchestration platform 102 may be at risk for scheduling processes 114 to incorrect nodes 112 (e.g., by deploying a process 114 to a node 112 that does not have the appropriate configuration and/or resources). However, by scheduling the labeling service 113 prior to the other processes 114, these risks are minimized and/or eliminated.

To label a given node 112, the labeling service 113 may communicate with the VMM 116. More specifically, the labeling service 113 may request, from the VMM 116, the host ID 117 of the host system 110-2. The host ID 117 may uniquely identify each virtualized host system 110-2 through 110-N managed by the VMM 116. Once the labeling service 113 receives the host ID 117 of the host system 110-2, the labeling service 113 may request one or more labels applied to the host system 110-2 from the VMM 116 using the host ID 117. In response, the VMM 116 may provide the labeling service 113 with one or more labels 118-1 that have been applied to the host system 110-2. The labels 118-1 may include labels that are programmatically generated (e.g., by the VMM 116 and/or other software, hardware, and/or firmware) as well as labels that are provided by a user. The labels 118-1 may be a string of characters forming key:value pairs of any length.

Once received, the labeling service 113 may validate each received label 118-1 based on one or more rules for labeling nodes 112. For example, the rules may include syntax rules, formatting rules, data type rules, and the like. If a given label 118-1 does not comply with one or more rules, the labeling service 113 may attempt to modify the label 118-1 to cause the label 118-1 to comply with the one or more rules. For example, the labeling service 113 may apply one or more regular expressions to the label 118-1 to modify the label 118-1 such that the modified label 118-1 complies with the one or more rules. In some embodiments, the labeling service 113 may filter the received labels 118-1 according to one or more desired labels. For example, the labeling service 113 may filter the labels 118-1 to exclude all labels 118-1 except for a desired "nodetype:programming" label. By filtering the labels 118-1, the labeling service 113 may subsequently apply only the desired labels to the nodes 112 (e.g., the "nodetype:programming" label), while not applying other undesired labels to the nodes 112.

The labeling service 113 may then determine an identifier of the node 112 that the labeling service 113 process is executing on. For example, the labeling service 113 may request the node ID 103 of the node 112 from the orchestration platform 102. Generally, the node IDs 103 include a unique identifier for each node 112 in the system 100. The orchestration platform 102 may then return the node ID 103 of the node 112 to the labeling service 113. In one embodiment, the labeling service 113 requests the node ID 103 through the orchestration agent 115, which is an agent that communicates with the orchestration platform 102. Therefore, in such embodiments, the labeling service 113 requests the node ID 103 from the orchestration agent 115, which requests and receives the node ID 103 from the orchestration platform 102 and provides the received node ID 103 to the labeling service 113.

The labeling service 113 may then instruct the orchestration agent 115 to apply the validated labels 118-1 to the node 112 having the received node ID 103. The orchestration agent 115 may then apply the labels 118-1 to the node 112. In one embodiment, the labeling service 113 communicates with the orchestration agent 115 to cause the labels 118-1 to be applied to the node 112. Therefore, in such embodiments, the orchestration agent 115 and/or the orchestration platform 102 may apply the labels 118-1 to the node 112.

Figure 1B:
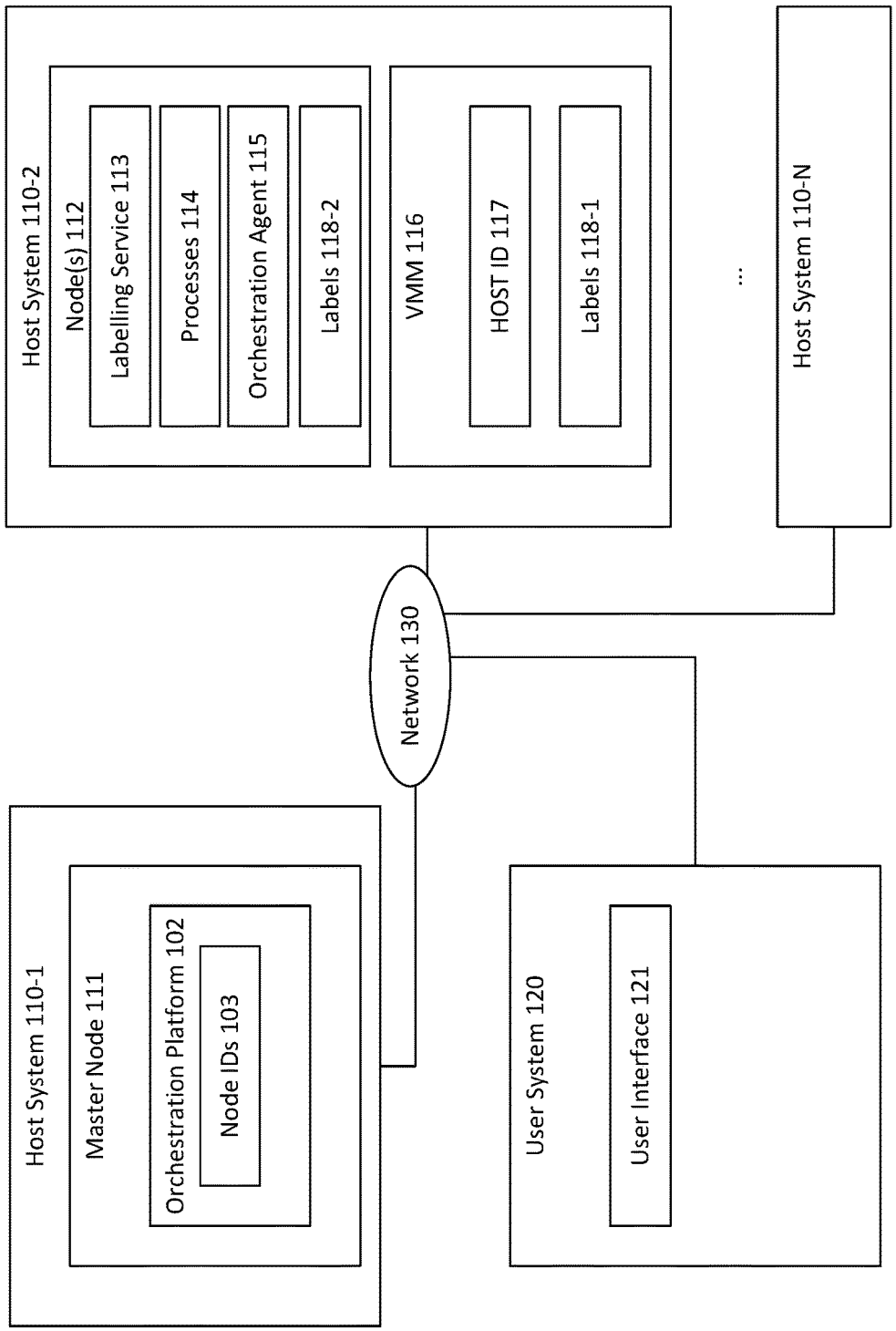

FIG. 1B depicts an embodiment where the labeling service 113 has labeled the node 112 of host system 110-2 with the labels 118-2, which may correspond to the labels 118-1 of the VMM 116 that have been validated by the labeling service 113. The labels 118-2 may further include a label indicating that the labeling service 113 has completed the labeling of the node 112. Doing so allows the labeling service 113 to refrain from re-labeling the node 112 based on identifying the label indicating the labeling has been completed. The labeling service 113 may then terminate execution.

FIG. 2A is a schematic 200 depicting an example host system 110-3 which includes nodes 112-1 through 112-N, where N is a positive integer. As shown, the node 112-1 includes the labeling service 113, which may execute prior to other processes 114 on the node 112-1 to tag the node 112-1 with one or more labels 118-1. As stated, to apply the labels 118-1 to the node 112-1, the labeling service 113 may receive the host ID 117 of the host system 110-3 from the VMM 116. The labeling service 113 may then receive the labels 118-1 from the VMM 116 using the received host ID 117. The labeling service 113 may then validate the received labels 118-1 using one or more rules and attempt to modify any labels 118-1 that do not satisfy the rules. For example, as shown, an example label 118-1 is "Label1:legal$", which includes the "$" character. If the rules only permit alphanumeric characters, the labeling service 113 may remove the "$" character from the label 118-1, e.g., using a regular expression. Doing so causes the modified label 118-1 to comply with the rule that labels only include alphanumeric characters.

The labeling service 113 may then receive the node ID 103 of the node 112-1 from the orchestration platform 102 and/or the orchestration agent 115. The labeling service 113 may then instruct the orchestration platform 102 and/or the orchestration agent 115 to apply the validated labels 118-1 to the node 112-1 using the received node ID 103 of the node 112-1. The orchestration platform 102 and/or the orchestration agent 115 may then cause the labels 118-1 to be applied to the node 112-1.

FIG. 2B is a schematic 210 illustrating an embodiment where the labeling service 113 has programmatically applied the labels 118-2 to the node 112-1. As shown, the labels 118-2 are based on the validated labels 118-1. For example, as shown, the labels 118-2 include the validated label "Label1:legal" rather than the label "Label1:legal$" of the labels 118-1 that did not comply with the rules.

Figure 3:
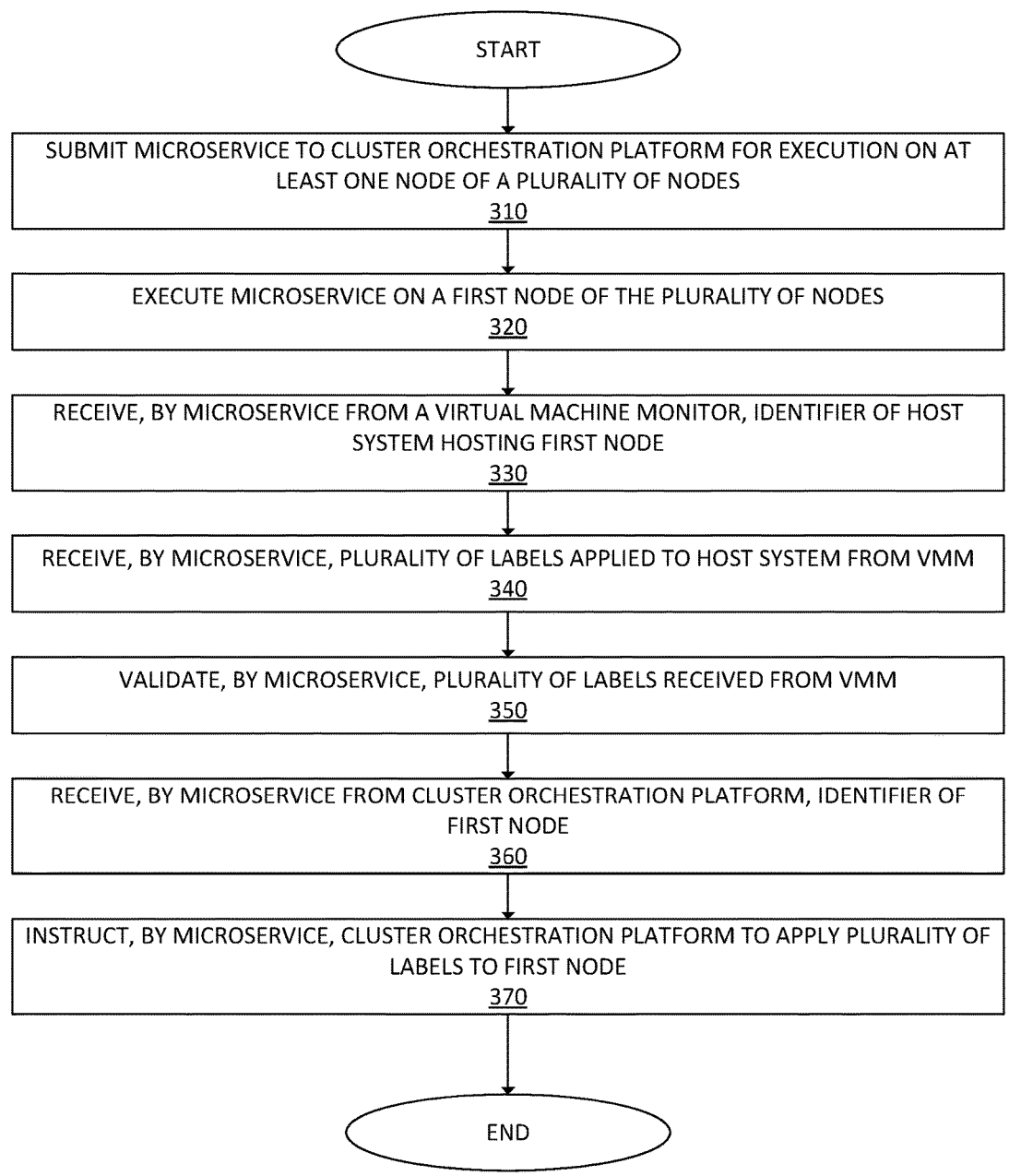
FIG. 3 illustrates an embodiment of a first logic flow.

FIG. 3 illustrates an embodiment of a logic flow 300. The logic flow 300 may be representative of some or all of the operations executed by one or more embodiments described herein. For example, the logic flow 300 may include some or all of the operations to programmatically label nodes in cluster orchestration platforms. Embodiments are not limited in this context.

As shown, the logic flow 300 begins at block 310, where the labeling service 113 is submitted to the cluster orchestration platform 102 for execution on at least one node 112 of a plurality of nodes. At block 320, the cluster orchestration platform 102 may schedule the labeling service 113 to execute on a first node 112-N on a first host system 110-N, where N is a positive integer. The host system 110-N may be a virtualized host system. One or more labels 118 may be applied to the host system 110-N. At block 330, the labeling service 113 may receive an identifier (e.g., a host ID 117) of the host system 110-N from the VMM 116.

At block 340, the labeling service 113 receives a plurality of labels 118 applied to the host system 110-N from the VMM 116. At block 350, the labeling service 113 may validate the labels received at block 340, e.g., based on one or more rules. At block 360, the labeling service 113 receives a node ID 103 of the node 112-N from the orchestration platform 102. At block 370, the labeling service 113 instructs the orchestration platform 102 to apply the validated labels 118 to the first node 112-N using the node ID 103 of the node 112-N received at block 360. Doing so causes the validated labels 118 to be applied to the first node 112-N.

Figure 4:
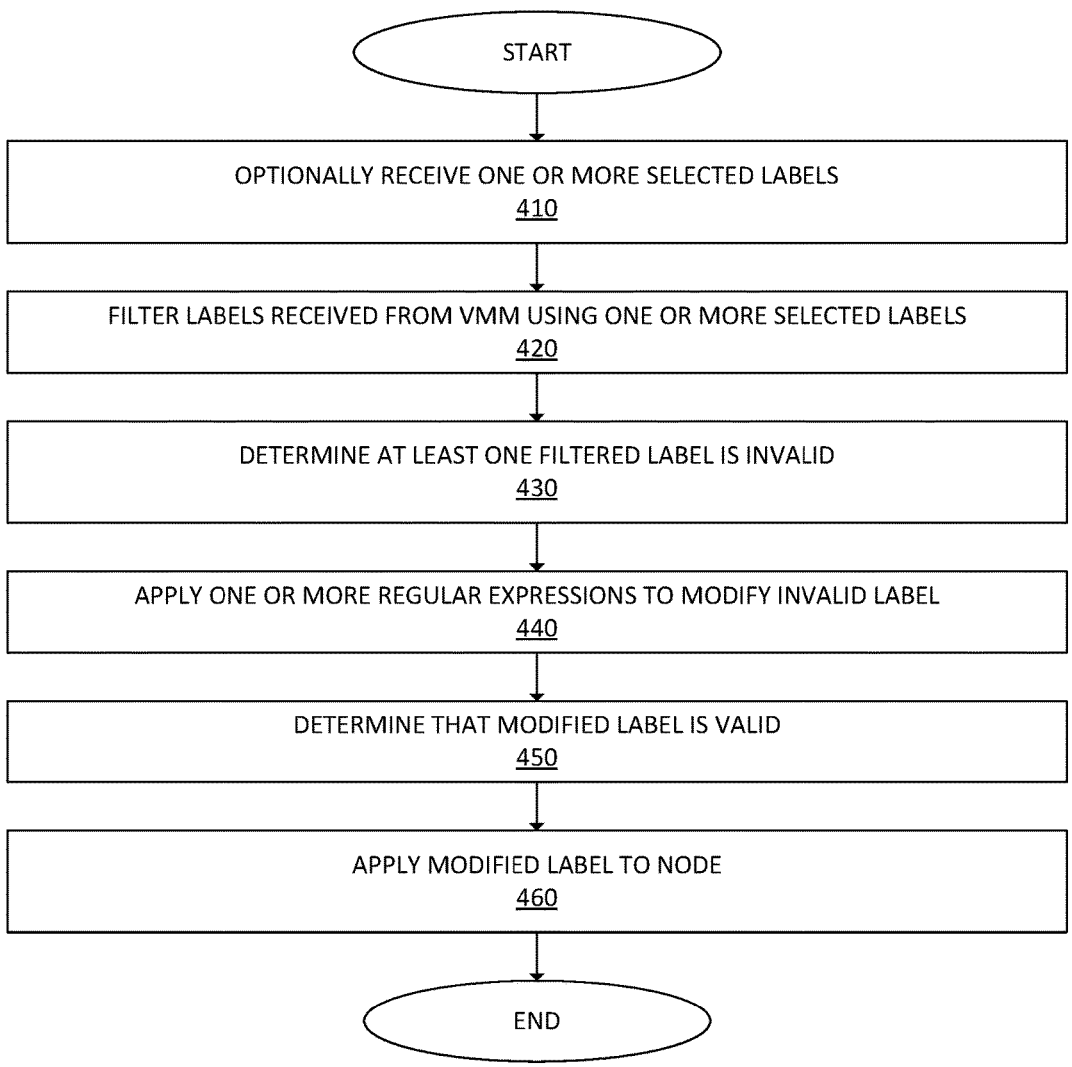
FIG. 4 illustrates an embodiment of a second logic flow.

FIG. 4 illustrates an embodiment of a logic flow 400. The logic flow 400 may be representative of some or all of the operations executed by one or more embodiments described herein. For example, the logic flow 400 may include some or all of the operations to validate labels. Embodiments are not limited in this context.

As shown, the logic flow 400 begins at block 410, where the labeling service 113 may receive one or more selected labels 118. For example, an administrator may specify one or more desired label key:pair values to use as a filter against the labels 118 received from the VMM 116. At block 420, the labeling service 113 may filter the labels 118 received from the VMM 116 using the one or more selected labels received at block 410. Doing so filters, or drops, labels 118 that do not equal the one or more selected labels. At block 430, the labeling service 113 determines that at least one filtered label 118 is not valid, e.g., based on one or more rules.

At block 440, the labeling service 113 applies one or more regular expressions to modify the at least one invalid label identified at block 430. At block 450, the labeling service 113 determines that the label 118 as modified by the regular expression is valid, e.g., satisfies all rules for validating labels. At block 460, the labeling service 113 may apply the modified label 118 to the target node 112.

Figure 5:
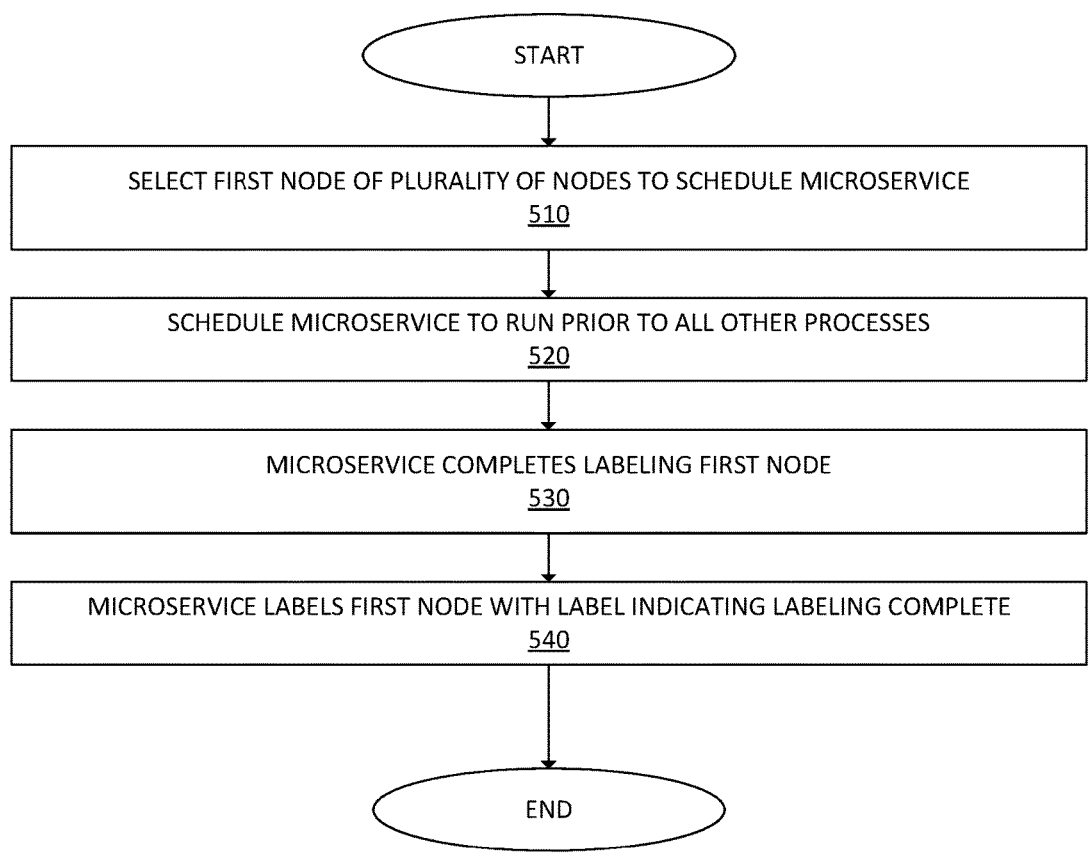
FIG. 5 illustrates an embodiment of a third logic flow.

FIG. 5 illustrates an embodiment of a logic flow 500. The logic flow 500 may be representative of some or all of the operations executed by one or more embodiments described herein. For example, the logic flow 500 may include some or all of the operations performed to schedule the labeling service 113 for execution on a node 112. Embodiments are not limited in this context.

As shown, the logic flow 500 begins at block 510, where the orchestration platform 102 selects a first node 112-1 of a plurality of nodes 112 to schedule the labeling service 113 on. At block 520, the orchestration platform 102 schedules the labeling service 113 to run prior to all other processes 114 on the first node 112-1. At block 530, the labeling service 113 completes the labeling of the first node 112-1 with validated labels 118. At block 540, the labeling service 113 labels the first node 112-1 with a label indicating that the labeling of the first node 112-1 is complete. The label may be any predefined label to indicate that the labeling is complete. Doing so may eliminate redundant labeling of the first node 112-1. The labeling service 113 may then terminate execution.

Figure 6:
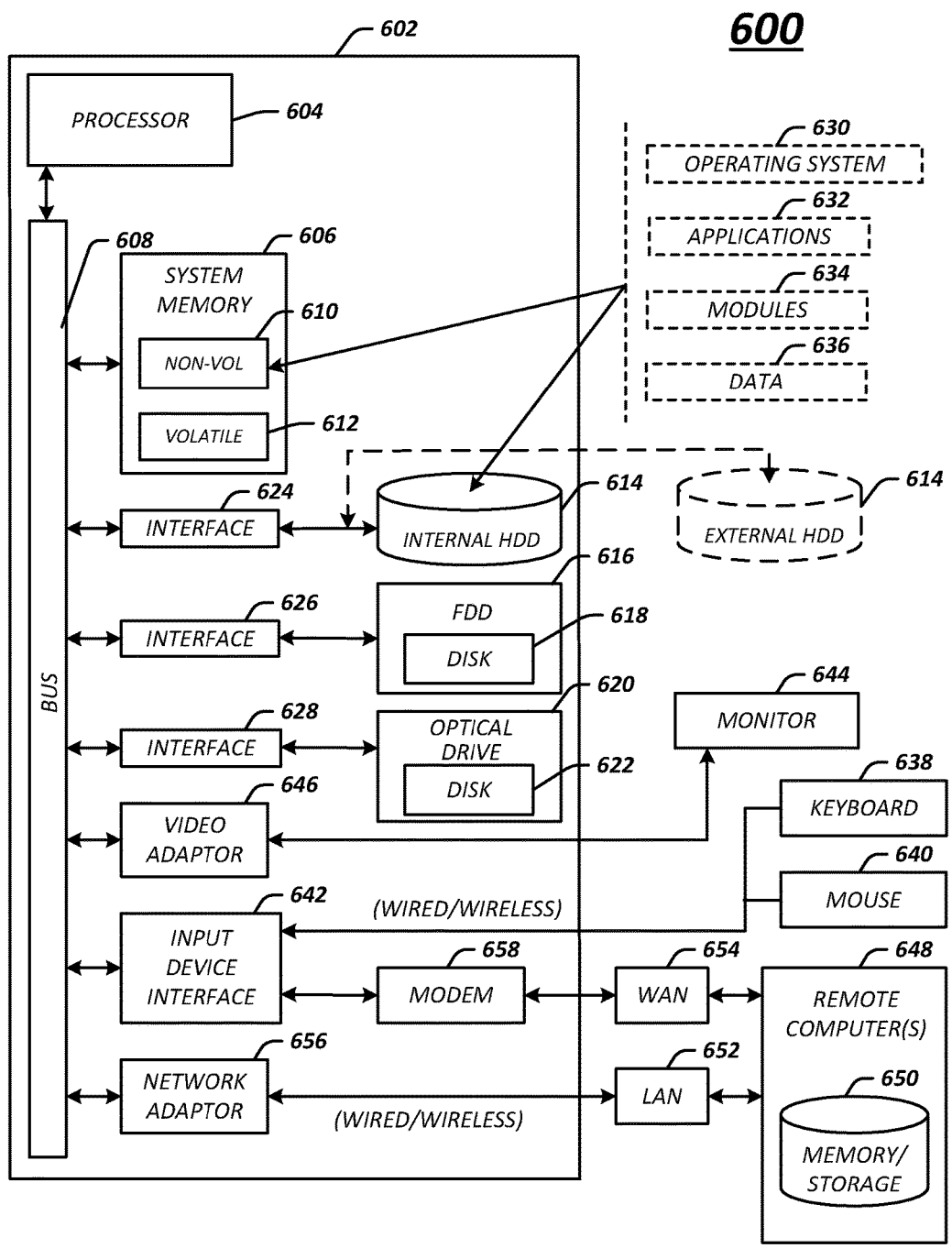
FIG. 6 illustrates an embodiment of a computing architecture.

FIG. 6 illustrates an embodiment of an exemplary computing architecture 600 comprising a computing system 602 that may be suitable for implementing various embodiments as previously described. In various embodiments, the computing architecture 600 may comprise or be implemented as part of an electronic device. In some embodiments, the computing architecture 600 may be representative, for example, of a system that implements one or more components of the system 100. In some embodiments, computing system 602 may be representative, for example, of the host systems 110 and user systems 120 of the system 100. The embodiments are not limited in this context. More generally, the computing architecture 600 is configured to implement all logic, applications, systems, methods, apparatuses, and functionality described herein with reference to FIGS. 1-6.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 602 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 602.

As shown in FIG. 6, the computing system 602 comprises a processor 604, a system memory 606 and a system bus 608. The processor 604 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 604.

The system bus 608 provides an interface for system components including, but not limited to, the system memory 606 to the processor 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computing system 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies. The computing system 602 is generally is configured to implement all logic, systems, methods, apparatuses, and functionality described herein with reference to FIGS. 1-5.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 100, e.g., the master node 111, the nodes 112, the orchestration platform 102, the node IDs 103, the labeling service 113, the processes 114, the orchestration agent 115, the VMM 116, the host IDs 117, the labels 118, the user system 120, and the user interface 121.

A user can enter commands and information into the computing system 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computing system 602. In addition to the monitor 644, a computer typically includes other peripheral output devices, such as speakers, printers, and so forth.

The computing system 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computing system 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 652 and the WAN 654.

When used in a LAN networking environment, the computing system 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computing system 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computing system 602, or portions thereof, can be stored in the remote memory/storage device 650. It will be appreciated that the network connections shown are exemplary and other means of establishing a communications link between the computers can be used.

The computing system 602 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An apparatus, comprising:
a processor circuit; and
a memory storing instructions which when executed by the processor circuit cause the processor circuit to:
submit, to a cluster orchestration platform managing a cluster comprising a plurality of nodes, a microservice to execute on one of the plurality of nodes;
execute, by the cluster orchestration platform, the microservice on a first node of the plurality of nodes;
receive, by the microservice from a virtual machine manager, an instance identifier of a virtual machine instance executing the first node and the microservice;
receive, by the microservice from the virtual machine manager based on the instance identifier, a plurality of labels applied to the virtual machine instance;
validate, by the microservice, each received label based on at least one rule for applying labels in the cluster orchestration platform;
receive, by the microservice from the cluster orchestration platform, an identifier of the first node in the cluster orchestration platform;
provide, by the microservice to the cluster orchestration platform, an indication specifying to apply each received label to the first node in the cluster orchestration platform;
apply, by the cluster orchestration platform, each received label to the first node in the cluster orchestration platform; and
apply, by the microservice to the first node in the cluster orchestration platform, a label specifying that labeling of the first node in the cluster orchestration platform has been completed.

2. The apparatus of claim 1, the memory storing instructions which when executed by the processor circuit cause the processor circuit to:
schedule, by the cluster orchestration platform, the microservice to execute prior to a plurality of jobs scheduled to execute on the first node.

3. The apparatus of claim 1, the memory storing instructions which when executed by the processor circuit cause the processor circuit to:
receive, by the microservice, a first label of the plurality of labels as a filter value;
filter, by the microservice, the plurality of labels based on the first label of the plurality of labels, the filtering to exclude at least a second label of the plurality of labels; and
apply, by the microservice, the first label to the first node in the cluster orchestration platform, the microservice to refrain from applying the second label to the first node in the cluster orchestration platform based on the filtering.

4. The apparatus of claim 1, the memory storing instructions which when executed by the processor circuit cause the processor circuit to:
receive, by the microservice, a first label of the plurality of labels;
determine, by the microservice, that the first label is not of a syntax required by the at least one rule for applying labels; and
refrain, by the microservice, from applying the first label to the first node in the cluster orchestration platform based on the first label not being of the required syntax.

5. The apparatus of claim 4, the memory storing instructions which when executed by the processor circuit cause the processor circuit to:
modify, by the microservice, the first label using a regular expression;
determine, by the microservice, that the modified first label is of the syntax required by the at least one rule for applying labels; and
apply, by the microservice, the modified first label to the first node in the cluster orchestration platform.

6. The apparatus of claim 1, wherein the plurality of nodes comprise virtualized computing systems and physical computing systems, wherein the cluster orchestration platform schedules the microservice to execute on the first node.

7. A non-transitory computer-readable storage medium storing computer-readable instructions executable by a processor circuit to cause the processor circuit to:
- receive, by a cluster orchestration platform managing a cluster comprising a plurality of nodes, a microservice to execute on one of the plurality of nodes;
- execute, by the cluster orchestration platform, the microservice on a virtual machine instance executing on a first node of the plurality of nodes;
- receive, by the microservice from a virtual machine manager, an instance identifier of a virtual machine instance executing the first node and the microservice;
- receive, by the microservice from the virtual machine manager based on the instance identifier, a plurality of labels applied to the virtual machine instance;
- validate, by the microservice, each received label based on at least one rule for applying labels in the cluster orchestration platform;
- provide, by the cluster orchestration platform to the microservice, an identifier of the first node in the cluster orchestration platform;
- receive, by the cluster orchestration platform from the microservice, an indication specifying to apply each received label to the first node in the cluster orchestration platform;
- apply, by the cluster orchestration platform, each received label to the first node in the cluster orchestration platform; and
- apply, by the microservice to the first node in the cluster orchestration platform, a label specifying that labeling of the first node in the cluster orchestration platform has been completed.

8. The computer-readable storage medium of claim 7, storing computer-readable instructions executable by the processor circuit to cause the processor circuit to:
- schedule, by the cluster orchestration platform, the microservice to execute prior to a plurality of jobs scheduled to execute on the first node.

9. The computer-readable storage medium of claim 7, storing computer-readable instructions executable by the processor circuit to cause the processor circuit to:
- receive, by the microservice, a first label of the plurality of labels as a filter value;
- filter, by the microservice, the plurality of labels based on the first label of the plurality of labels, the filtering to exclude at least a second label of the plurality of labels; and
- apply, by the microservice, the first label to the first node in the cluster orchestration platform, the microservice to refrain from applying the second label to the first node in the cluster orchestration platform based on the filtering.

10. The computer-readable storage medium of claim 7, storing computer-readable instructions executable by the processor circuit to cause the processor circuit to:
- receive, by the microservice, a first label of the plurality of labels;
- determine, by the microservice, that the first label is not of a syntax required by the at least one rule for applying labels; and
- refrain, by the microservice, from applying the first label to the first node in the cluster orchestration platform based on the first label not being of the required syntax.

11. The computer-readable storage medium of claim 10, storing computer-readable instructions executable by the processor circuit to cause the processor circuit to:
- modify, by the microservice, the first label using a regular expression;
- determine, by the microservice, that the modified first label is of the syntax required by the at least one rule for applying labels; and
- apply, by the microservice, the modified first label to the first node in the cluster orchestration platform.

12. The computer-readable storage medium of claim 7, wherein the plurality of nodes comprise virtualized computing systems and physical computing systems, wherein the cluster orchestration platform schedules the microservice to execute on the first node.

13. A method, comprising:
- submitting, to a cluster orchestration platform managing a cluster comprising a plurality of nodes, a microservice to execute on one of the plurality of nodes;
- executing, by the cluster orchestration platform, the microservice on a first node of the plurality of nodes;
- receiving, by the microservice from a virtual machine manager, an instance identifier of a virtual machine instance executing the first node and the microservice;
- receiving, by the microservice from the virtual machine manager based on the instance identifier, a plurality of labels applied to the virtual machine instance;
- validating, by the microservice, each received label based on at least one rule for applying labels in the cluster orchestration platform;
- receiving, by the microservice from the cluster orchestration platform, an identifier of the first node in the cluster orchestration platform;
- providing, by the microservice to the cluster orchestration platform, an indication specifying to apply each received label to the first node in the cluster orchestration platform;
- applying, by the cluster orchestration platform, each received label to the first node in the cluster orchestration platform; and
- applying, by the microservice to the first node in the cluster orchestration platform, a label specifying that labeling of the first node in the cluster orchestration platform has been completed.

14. The method of claim 13, further comprising:
- scheduling, by the cluster orchestration platform, the microservice to execute prior to a plurality of jobs scheduled to execute on the first node.

15. The method of claim 13, further comprising:
- receiving, by the microservice, a first label of the plurality of labels as a filter value;
- filtering, by the microservice, the plurality of labels based on the first label of the plurality of labels, the filtering to exclude at least a second label of the plurality of labels; and
- applying, by the microservice, the first label to the first node in the cluster orchestration platform, the microservice to refrain from applying the second label to the first node in the cluster orchestration platform based on the filtering.

16. The method of claim 13, further comprising:
- receiving, by the microservice, a first label of the plurality of labels;
- determining, by the microservice, that the first label is not of a syntax required by the at least one rule for applying labels; and
- refraining, by the microservice, from applying the first label to the first node in the cluster orchestration platform based on the first label not being of the required syntax.

17. The method of claim 16, further comprising:
modifying, by the microservice, the first label using a regular expression;
determining, by the microservice, that the modified first label is of the syntax required by the at least one rule for applying labels; and
applying, by the microservice, the modified first label to the first node in the cluster orchestration platform, wherein the plurality of nodes comprise virtualized computing systems and physical computing systems, wherein the cluster orchestration platform schedules the microservice to execute on the first node.

* * * * *